Sept. 25, 1928.
W. H. THIEMER
UNIVERSAL JOINT
Original Filed Nov. 17, 1922
1,685,510
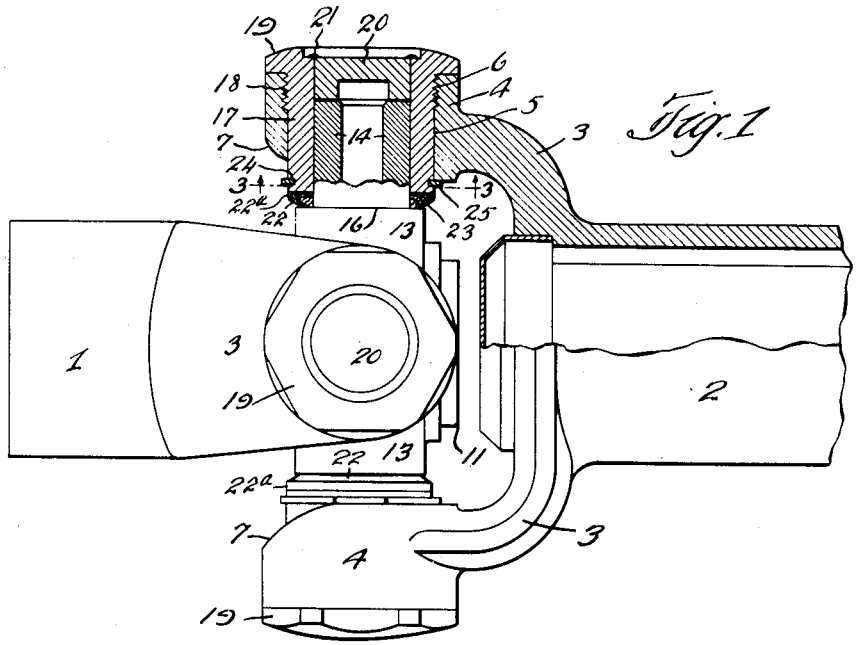
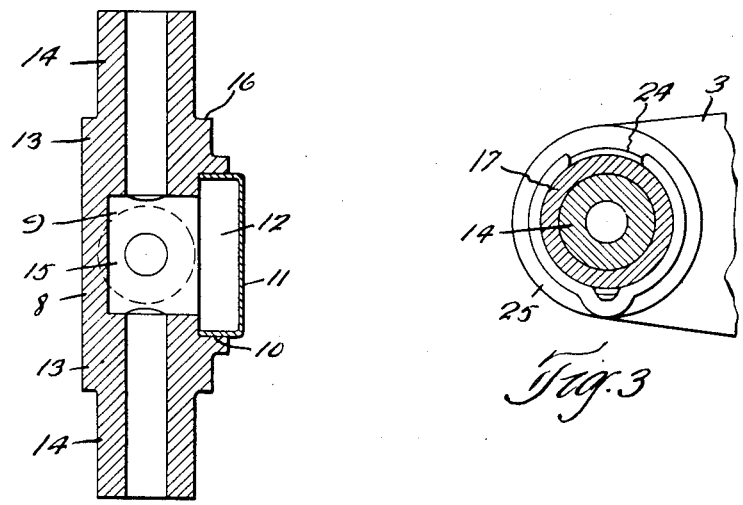
Inventor
William H. Thiemer,
By Hull, Buck & West
Attys.

Patented Sept. 25, 1928.

1,685,510

UNITED STATES PATENT OFFICE.

WILLIAM H. THIEMER, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Refiled for abandoned application Serial No. 601,458, filed November 17, 1922. This application filed October 24, 1924. Serial No. 745,714.

This invention relates to universal joints, and more particularly to joints of the lubricating type. The general object of the invention is to provide a joint of this character which is capable of operating efficiently with light or thin oil. A further object of the invention is to provide joints of this type with an efficient means for retaining the bushings thereof in place; a still further object of the invention is to provide for such joints an improved construction of lubricant well within the central portion of the cross member.

In the drawings forming a part hereof, Fig. 1 represents a sectional elevation of a joint constructed in accordance with my invention; Fig. 2 a vertical sectional view through the cross member shown in Fig. 1; and Fig. 3 a sectional view corresponding to the line 3—3 of Fig. 1.

In the drawings forming a part hereof, 1 and 2 denote the hubs of the joint, said hubs being adapted to be attached in the usual manner to their respective shaft sections (not shown). Each hub is shown as provided with a pair of integral arms 3, each having a bearing block 4, each block having a bore 5 extending therethrough, the outer end of each bore being threaded, as indicated at 6. The outer portion of each bearing block which is presented toward the cross member is beveled away, as shown at 7, to facilitate assembling.

The cross member comprises a central body 8 having an enlarged well 9 for lubricant, the well extending inwardly from one side, and the bottom of the well being formed by the metal of which the cross member is composed. The outer end of the well is expanded and provided with a cylindrical wall 10 which is adapted to form a seat for and to receive the cylindrical flange 12 of a cap 11. As will appear from Fig. 2, when the cap is applied to its seat within the cylindrical wall 10, it projects beyond the body of the cross member and forms with the chamber 9 therein a well of great capacity. The cap is secured in place by having a tight pressed-fit with the seat 10, whereby an oil-tight joint is provided.

The cross member will preferably have one pair of arms 13 and trunnions 14 formed integral therewith, while the opposite arms will be of substantially the length of the arms 13, the trunnions being preferably formed by an insertible sleeve 15. The arrangement referred to is merely for the purpose of facilitating the assembly of the cross member with arms formed integral with their hubs and having continuous integral bearing blocks and, in its details, forms no part of the invention sought to be covered by this application. In whatever manner the arms and trunnions may be formed, there will be an annular shoulder 16 provided at the inner end of each trunnion.

17 denotes the cylindrical body of a bushing adapted to receive within its inner surface the trunnion 14 and having near the outer end of its outer cylindrical surface a thread 18 adapted to mesh with the thread 6. Each bushing is provided with a flange 19 adapted to engage the outer end of its bearing block and has its center closed in any convenient manner, as by means of a cap 20 fitted within the outer end of its bore and electrically welded to the bushing, as indicated at 21, the parts being so arranged that the flange 19 will engage the outer surface of the block 4 slightly in advance of the engagement of the inner end of the cap 20 with the outer end of its trunnion, whereby room or clearance will be provided for a film of oil beyond the outer end of the trunnion.

To prevent the leakage of oil from the inner end of the bushing bore, I provide the following construction:

22 denotes a resilient sheet metal ring having a flange 22ª the upper or outer edge whereof is adapted to engage the peripheral portion of the adjacent inner end of a bushing 17. The lower or inner edge of such ring is bent inwardly toward the shoulder 16' and the trunnion 14, whereby it forms with the said trunnion and bushing an annular pocket for a ring of packing material 23, preferably cork. The flange 22ª will resist outward expansion of the upper or outer end of the ring, while its lower end will engage the shoulder 16 in advance of the abutting of the inner face of the flange 19 with the outer face of the bearing block 4. With this arrangement, it is evident that, by screwing in on the bushing, the packing will be compressed against the joint formed between the bushing and the trunnion, thereby preventing leakage.

To prevent the unscrewing of the bushing, with the consequent relieving of pressure on the packing, I provide each bushing with an annular groove 24 extending therearound and adapted to receive an open or split spring locking ring 25. The groove and the ring are preferably rectangular in section and the groove is so located that the ring will engage the inner end of its bearing block when the ring 22 and packing are under compression, the inner end of the bearing block being faced off to provide an extended engaging surface for the ring.

This application is filed in lieu of my application No. 601,458 filed November 17, 1922, which became abandoned on July 14, 1924.

Having thus described my invention, what I claim is:—

1. In a universal joint, the combination with a trunnion having a shoulder at its inner end, of a bearing block adapted to receive such trunnion and having a bore provided with a thread, a bushing threaded into such bore and receiving the trunnion therewithin, a ring of resilient metal surrounding such trunnion and interposed between the inner end of said bushing and its cooperating shoulder, said ring having a cylindrical flange whose outer edge is adapted to be engaged by the inner end of the bushing and a portion deflected inwardly from such flange toward said shoulder and the trunnion and adapted to engage said shoulder thereby forming a pocket between the inner end of the trunnion and the bushing, which pocket is adapted to be contracted in cross-sectional area by screwing said bushing inwardly, compressible packing material in said pocket and directly engaging said trunnion, and means for conducting lubricant to the space between the bushing and the trunnion.

2. In a universal joint, the combination of a hollow cross member having hollow trunnions projecting therefrom, there being a shoulder provided at the inner end of each trunnion, a bearing block adapted to receive each trunnion and having each a bore provided with a thread, a capped bushing threaded into each bore and receiving therewithin a trunnion, each bushing having an annular groove therearound and a resilient locking ring in such groove adapted to engage the inner end of a bearing block when the said bushing is screwed home, and a compressible washer interposed between the inner end of each bushing and its cooperating shoulder.

3. In a universal joint, the combination of a bearing block having a bore therethrough provided with a thread, a bushing having a thread adapted to mesh with the thread in said bore and provided with a flange adapted to engage with the outer face of said block, a cross member having a trunnion adapted to be received within said bushing, the said bushing having an annular groove in the exterior thereof, and a split or open ring adapted to be applied to said groove and to engage the inner end of the bearing block when the said flange shall have substantially contacted with the outer end of such block.

4. A universal joint comprising bearing blocks and a cross member having trunnions for said blocks, the said trunnions having bores communicating with the central well in said cross member, the said well extending inwardly into the central portion of said member from one side thereof and being provided adjacent to such side with a cylindrical seat of greater diameter than the diameter of the main portion of said well, and a cap having a cylindrical flange having a pressed-fit in said seat, said cap and said cylindrical seat forming a lubricant chamber in addition to the well in said cross member.

5. A universal joint comprising bearing blocks and a cross member having trunnions for said blocks, the said trunnions having bores communicating with a central well in said cross members, said well extending inwardly from one side, the bottom of the well being formed by the metal of which the cross member is composed, the outer end of the well being expanded and provided with a cylindrical wall, a cylindrical cap having a flange adapted to be secured within said cylindrical wall, the end wall of the cap projecting beyond the body of the cross member whereby to cooperate with said well to form an enlarged lubricant receiving chamber.

In testimony whereof, I hereunto affix my signature.

WILLIAM H. THIEMER.